US008010711B2

(12) United States Patent  
Amron et al.

(10) Patent No.: US 8,010,711 B2
(45) Date of Patent: Aug. 30, 2011

(54) UNIVERSAL MULTIMEDIA

(75) Inventors: Alan Amron, Brooklyn, NY (US); Eric T. Brewer, Saratoga, CA (US)

(73) Assignee: Digital Video Chip, LLC, Woodbury, NY (US)

( * ) Notice: Subject to any disclaimer, the term of this patent is extended or adjusted under 35 U.S.C. 154(b) by 379 days.

(21) Appl. No.: 12/130,744

(22) Filed: May 30, 2008

(65) Prior Publication Data

US 2008/0307128 A1 Dec. 11, 2008

Related U.S. Application Data

(63) Continuation-in-part of application No. 11/726,784, filed on Mar. 23, 2007, which is a continuation-in-part of application No. 11/704,847, filed on Feb. 9, 2007, which is a continuation-in-part of application No. 11/698,699, filed on Jan. 26, 2007.

(51) Int. Cl.
 G06F 3/00 (2006.01)
 G06F 13/00 (2006.01)
(52) U.S. Cl. .................. 710/8; 710/5; 710/14; 710/15; 710/33
(58) Field of Classification Search .................. None
 See application file for complete search history.

(56) References Cited

U.S. PATENT DOCUMENTS

| | | | |
|---|---|---|---|
| 5,214,622 A | 5/1993 | Nemoto et al. | |
| 5,646,629 A | 7/1997 | Loomis et al. | |
| 5,978,855 A | 11/1999 | Metz et al. | |
| 6,085,199 A | 7/2000 | Rose | |
| 6,120,379 A | 9/2000 | Tanaka et al. | |
| 6,322,447 B1 | 11/2001 | Okada et al. | |
| 6,392,613 B1 | 5/2002 | Goto | |
| 6,716,103 B1 | 4/2004 | Eck et al. | |
| 6,743,104 B1 | 6/2004 | Ota et al. | |
| 6,764,400 B1 | 7/2004 | Yokoi et al. | |
| 6,810,463 B2 | 10/2004 | Okada et al. | |
| 6,811,492 B1 | 11/2004 | Arakawa et al. | |
| 7,352,601 B1 | 4/2008 | Minneman et al. | |
| 2002/0174277 A1 | 11/2002 | Hoshino et al. | |
| 2003/0095156 A1 | 5/2003 | Klein et al. | |
| 2003/0158901 A1* | 8/2003 | Ludwig et al. ................. | 709/205 |

(Continued)

FOREIGN PATENT DOCUMENTS

EP 0 696 873 2/1996

(Continued)

OTHER PUBLICATIONS

Katata, Hiroyuki, MPEG-4 Camera for Use with Internet, Jun. 28, 1999, Ieeexplore.org [online, accessed on Mar. 12, 2011], URL: http://ieeexplore.ieee.org/stamp/stamp.jsp?tp=&arnumber= 793562& userType=inst.*

(Continued)

Primary Examiner — Tariq Hafiz
Assistant Examiner — Scott Sun
(74) Attorney, Agent, or Firm — Cohen Pontani Lieberman & Pavane LLP

(57) ABSTRACT

A memory device removably insertable into or otherwise removably connected to a plurality of host devices includes a first memory storing multimedia data. A first circuit portion of the memory device determines the host device capabilities when the memory device is connected to a host device and a second circuit portion feeds the multimedia data to the host device in a format compatible with the determined capabilities of the host device.

41 Claims, 12 Drawing Sheets

U.S. PATENT DOCUMENTS

| | | |
|---|---|---|
| 2004/0054826 A1 | 3/2004 | Kavanagh |
| 2004/0098556 A1 | 5/2004 | Buxton et al. |
| 2004/0172658 A1 | 9/2004 | Rakib et al. |
| 2005/0226324 A1* | 10/2005 | Ouyang et al. ........... 375/240.12 |
| 2007/0202956 A1 | 8/2007 | Ogasawara et al. |
| 2007/0223876 A1 | 9/2007 | Hashimoto et al. |
| 2010/0190438 A1 | 7/2010 | Chen |

FOREIGN PATENT DOCUMENTS

| | | |
|---|---|---|
| EP | 1 768 401 | 3/2007 |
| GB | 2 403 868 | 1/2005 |

OTHER PUBLICATIONS

International Preliminary Report on Patentability dated Apr. 25, 2011 issued in corresponding application No. PCT/US08/06834.

Office Action dated Mar. 3, 2011 issued in corresponding U.S. Appl. No. 11/704,847.

Office Action dated Mar. 6, 2011 issued in corresponding U.S. Appl. No. 11/726,784.

* cited by examiner

FAT 16 File System

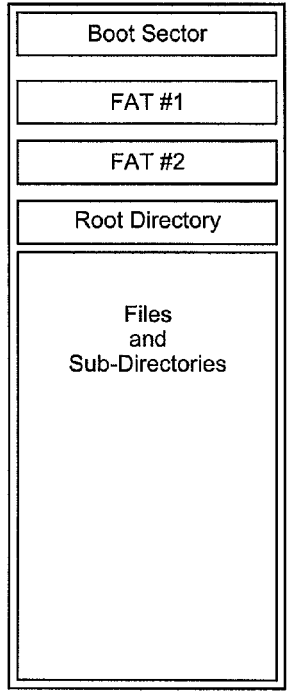

| Boot Sector | |
|---|---|
| 0xEB 3C 90 | 0x0000 0000..02 Jump instruction |
| MSDOS5.0 | 0x0000 0003...0A OEM name |
| 0x0002 (512) | 0x0000 000B..0C bytes per sector |
| 0x40 (64) | 0x0000 000D sectors per cluster |
| 0x0800 (8) | 0x0000 000E..0F reserved sector count |
| 0x02 (2) | 0x0000 0010 number of file allocation tables (FATs) |
| 0x0002 (512) | 0x0000 0011..12 max # of root dir entries |
| 0x0000 (0) | 0x0000 0013..14 Total sectors - if 0, use value at 0x20 |
| 0xF8 | 0x0000 0015 media descriptor |
| 0xF000 (240) | 0x0000 0016..17 sectors per FAT |
| 0x3F00 (63) | 0x0000 0018..19 sectors per track |
| 0xFF00 (255) | 0x0000 001A..1B number of heads |
| 0xFF00 0000 (255) | 0x0000 001C..1F hidden sectors |
| 0x01FF 3B00 (3931905) | 0x0000 0020..23 total sectors if > 65535 |
| 0x00 | 0x0000 0024 physical drive number |
| 0x00 | 0x0000 0025 reserved |
| 0x29 | 0x0000 0026 extended boot signature |
| 0x828E 44AC | 0x0000 0027..2A serial number (ID) |
| 'NO NAME....' | 0x0000 002B..35 volume label |
| 'FAT16...' | 0x0000 0036..3D FAT file system type |
| ... | 0x0000 003E..1FB operating system boot code |
| 0x0000 55AA | 0x0000 01FC..1FF Boot sector signature |

FAT 32 File System

2 GB disk / 4 KB clusters

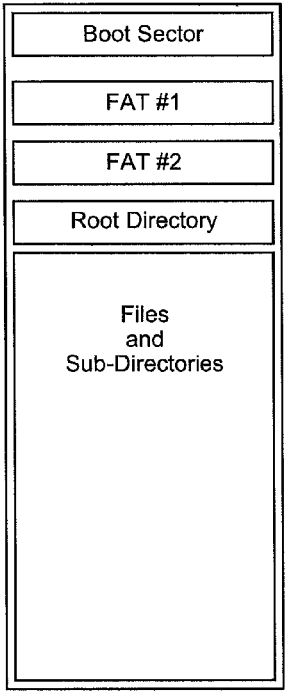

| | |
|---|---|
| Boot Sector | 0x0000 0000<br>0x0000 01FF |
| FAT #1 | 0x0000 4C00<br>0x000F 35FF |
| FAT #2 | 0x000F 3600<br>0x0003 BFFF |
| Root Directory | 0x001E 2000<br>0x001E 2FFF |
| | 0x001E 3000 |
| Files<br>and<br>Sub-Directories | |
| | 0x77F9 7FFF |

Boot Sector

| Value | Offset | Description |
|---|---|---|
| 0xEB 58 90 | 0x0000 0000..02 | Jump instruction |
| MSDOS5.0 | 0x0000 0003..0A | OEM name |
| 0x0002 (512) | 0x0000 000B..0C | bytes per sector |
| 0x08 (8) | 0x0000 000D | sectors per cluster |
| 0x2600 (38) | 0x0000 000E..0F | reserved sector count |
| 0x02 (2) | 0x0000 0010 | number of file allocation tables (FATs) |
| 0x0000 | 0x0000 0011..12 | not used - max # of root dir entries |
| 0x0000 (0) | 0x0000 0013..14 | Total sectors - if 0, use value at 0x20 |
| 0xF8 | 0x0000 0015 | media descriptor |
| 0x0000 | 0x0000 0016..17 | not used - sectors per FAT |
| 0x3F00 (63) | 0x0000 0018..19 | sectors per track |
| 0xFF00 (255) | 0x0000 001A..1B | number of heads |
| 0xFF00 0000 (255) | 0x0000 001C..1F | hidden sectors |
| 0x01FF 3B00 (3931905) | 0x0000 0020..23 | total sectors if > 65535 |
| 0xF90E 0000 (3833) | 0x0000 0024..27 | sectors per FAT |
| 0x0000 (0) | 0x0000 0028..29 | extended flags |
| 0x0000 (0) | 0x0000 002A..2B | file system version |
| 0x0200 0000 (2) | 0x0000 002C..2F | root directory cluster |
| 0x0100 (1) | 0x0000 0030..31 | file system info sector # |
| 0x0600 (6) | 0x0000 0032..33 | backup boot sector # |
| ... | 0x0000 0034..3F | reserved - unused |
| 0x00 (0) | 0x0000 0040 | BIOS physical drive # |
| 0x00 (0) | 0x0000 0041 | reserved - unused |
| 0x29 | 0x0000 0042 | extended boot signature |
| 0xBFB5 F1A4 | 0x0000 0043..46 | serial number (ID) |
| 'NO NAME....' | 0x0000 0047..51 | volume label |
| 'FAT16...' | 0x0000 0052..59 | FAT file system type |
| ... | 0x0000 005A..1FB | operating system boot code |
| 0x0000 55AA | 0x0000 01FC..1FF | Boot sector signature |

FAT16/FAT32 Directory Entries

Directory entries

| Entry | Offset | Description |
|---|---|---|
| 'themovie' | 0x00..07 | 8 character filename |
| 'mp4' | 0x08..0A | 3 character filename extension |
| xx | 0x0B | attributes |
| 0x00 (0) | 0x0C | reserved - use by NT |
| xx | 0x0D | creation time (10 ms units) |
| xxxx | 0x0E..0F | creation time (hour/min/sec) |
| xxxx | 0x10..11 | creation date (year/month/day) |
| xxxx | 0x12..13 | last access date |
| xxxx | 0x14..15 | cluster location high bytes |
| xxxx | 0x16..17 | last modification time (hour/min/sec) |
| xxxx | 0x18..19 | last modification date (year/month/day) |
| xxxx | 0x1A..1B | cluster location low bytes |
| xxxx xxxx | 0x1C..1F | file size in bytes |

Fig. 5 Prior Art

UNIVERSAL MULTIMEDIA

CROSS REFERENCE TO RELATED APPLICATIONS

This application is a continuation-in-part of U.S. patent application Ser. No. 11/726,784 filed on Mar. 23, 2007; which is a continuation-in-part of U.S. patent application Ser. No. 11/704,847 filed on Feb. 9, 2007; which is a continuation-in-part of U.S. patent application Ser. No. 11/698,699 filed on Jan. 26, 2007, the entire contents of all of which are expressly incorporated herein by reference.

BACKGROUND

1. Field of the Disclosure

The present disclosure relates to a player-independent medium for storing digital multimedia content.

2. Related Art

Digital multimedia content includes digital images, digital video and digital audio. Each of these is formed of basic components that can be represented digitally. Pixels are the basic components of digital still images and digital video. The basic components of digital audio, for example, include samples of an analog audio waveform taken over time. Each of the basic components requires a certain amount of memory. Accordingly, the memory required for storing multimedia content increases with increased playback or presentation resolution and/or sampling rate of digital multimedia. Thus, to increase the quality of the image or sound, one must sacrifice memory space.

A digital image is represented by an array of pixels, each pixel being a discrete dot that appears on a display screen. In digital video, a series of images or pictures are displayed in rapid succession. There are many competing standards which are used to define a pixel's content (e.g., RGB, YUV, CYMK, HSI, HSV, and CIE). Regardless of which standard is used to define the content of each pixel, the amount of memory required to store all of the information for the digital images or pictures in a movie is substantial. For example, a typical feature length film is 118 minutes with 24 frames or pictures per second. Each frame or picture on a current DVD has 720 pixels horizontally and 480 pixels vertically, with each pixel using two bytes for its color. This requires 117.5 GB, the equivalent of multiple DVDs, to contain the entire film. To address this problem, image compression is used to remove or change some details that can not readily be perceived by a viewer, so that creation of the image requires less information and the image can be stored using less memory. Video compression further reduces the memory required for storing video data by primarily storing and taking into account differences between successive frames or images.

Just as there are multiple standards for defining the content of pixels, there are also many different standards for image compression and video compression such as, for example, MJPEG, MPEG-2, MPEG-4, WMV, and RealVideo. One of the reasons for this is that there are many different types of devices which can reproduce videos with a wide range of capabilities. Products with small screens, limited memory, or limited communications bandwidth require highly compressed videos. On the opposite end of the spectrum, products used in movie production require very high resolution or quality source material and thus use only a minimum of compression while sacrificing memory space to maintain the high quality of the image.

Digital audio exhibits the same limitations with respect to memory. That is, a high sampling rate is necessary to provide high quality audio and a high sampling rate also requires a large number of samples to be stored. Accordingly, digital audio compression techniques are commonly used to reduce the amount of memory required to store the audio data. There are also a multiplicity of standards for audio compression such as, for example, the MP3, WMA, and AAC standards.

Because of the many different standards that are variously used for compressing audio and video data, not all devices can play back all bit streams of stored or streamed multimedia data. Thus, multimedia data that is compressed and stored on a memory card for playback on a computer or television, for example, will typically not be playable on a smaller or lower-resolution device, such as a cell phone.

An example of a compression standard is MPEG-4, which is the latest compression standard developed by the Moving Picture Expert Group (MPEG). MPEG-4 is used in a wide variety of devices including, but not limited to, cell phones, TVs, computers, set top boxes (cable and satellite), movie cameras, still cameras, and security systems. To satisfy such a broad range of equipment, MPEG-4 includes a group of several profiles or layers for accommodating various device capabilities. Because of all the different standards, and the different profiles within the MPEG-4 standard, a particular device that plays MPEG-4 files may not be able to play back all MPEG-4 bit streams.

A typical MPEG-4 encoder 100 is illustrated in FIG. 1. Uncompressed video data is input at, for example, 30 frames per second (or 24 frames per second for film movies). The uncompressed data is first converted from the spatial domain (i.e., pixel representation) into the frequency domain by a Discrete Cosine Transform (DCT) 102. After the transformation, the data is represented differently, but is still the same size as the spatial domain data. Representing the data in the frequency domain facilitates removal of those parts of the video that are difficult to perceive because fine details in the spatial domain are represented as high frequency components in the frequency domain. Image compression is effected by a quantizer 104 which is used to remove the high frequency components in the transformed data. Video compression is also effected by a motion detection/motion compression block 106 which determines where blocks of an image have moved or otherwise changed from one frame to the next. This helps to compress the data even further because less data is required to instruct vertical and/or horizontal movement of a part of a previous image or frame than the data required to store or stream the complete image or frame. The quantized/motion compressed data is fed to an entropy compression block 108 which performs a lossless compression of the remaining data, which further reduces the quantized/motion compressed data by a factor of 2 to 4.

The audio data is similarly compressed in an audio encode block 110 in which sampled audio data is transformed into the frequency domain, and filters and algorithms are applied to remove details of the audio information which cannot or would not be noticed by most people. This process is referred to as psycho-acoustic modeling.

The compressed video and audio streams are combined into a final stream by a multiplexer 112. Timing information is inserted into the stream so that the audio and video streams are synchronized when played back.

To view the original video data which was compressed, the compressed data must be decoded using an MPEG decoder 200, for example, as shown in FIG. 2. When the video is to be played back, the MPEG bit stream which was previously encoded by the encoder 100 is fed to an MPEG stream demultiplexer 212 which separates the compressed audio and video streams. An entropy block 208 restores the data, and an inverse quantizer 204 produces DCT data. An inverse DCT (IDCT) block 202 transforms the data from the frequency domain into the spatial domain as pixels. A motion detection/motion compensation block 206 takes the instructions from the compressed stream and replaces those instructions with pixel data for each image, which is sent to the IDCT 202. The compressed audio stream is similarly decoded in an audio decoder to produce an audio stream.

The multimedia data files that are discussed above are stored and organized on a non-volatile memory using a file system which is then used by a host device to retrieve the file from the memory device. The file system is a method of keeping track of where files are located and also provides directories and/or folders to provide a hierarchical arrangement of the files. The file system also retains metadata about the files being stored.

The file system typically divides the memory into portions which may, for example, be referred to as sectors. A sector may be any number of bytes in size. However, a common size is 512 bytes. Groups of contiguous sectors may be managed as blocks or clusters which makes it easier and faster to manage the files. The determination of how big a block or cluster to manage is based on balancing time and space. Larger blocks or clusters result in wasted space, especially if small files (1–2 KB) are being stored. Multimedia files are large (1 MB or more) and therefore there is little wasted space even if 32 KB blocks (64*512 Byte sectors) are used. As stated above, the file system keeps track of where files are located in the memory. The location of files is indicated by the starting address of blocks. Once a host device selects a file, the file system maps the request to a specific location in the memory. Thus, the file system obviates the requirement that a user or host device know where physically in the memory the requested file is saved.

Flash memories typically use Windows FAT16 and FAT32 file systems. FIG. 3a shows that a 2 GB memory device using FAT16 file system includes a Boot Sector, File Allocation Tables FAT#1 and FAT#2, a Root Directory, and Files and Subdirectories. When a host device accesses any memory device, the host device initially reads the first block, i.e., address 0000, to determine what is stored on the memory device. For FAT16 and FAT 32 file systems, the first block contains the Boot Sector which includes information on where the other information is stored on the media. FIG. 3b illustrates the typical contents of a Boot Sector for an FAT 16 file system. Based on the information in the Boot Sector, the host device then knows where to look for the root directory and requests to read the root directory to determine what files are in the memory device. FIGS. 4a and 4b show the contents of a memory device and Boot Sector, respectively, for an FAT 32 file system. FIG. 5 is an example of meta data which is stored for each file.

FIG. 6 shows an example of a memory having two files stored using FAT 16/32 file system. The root directory shows two files stored. A pointer for each file which indicates where the files are stored is determined from the File Allocation Tables FAT#1 and FAT#2. Accordingly, when a host device requests to read one of the files, the request is directed to the address associated with the requested file.

SUMMARY

An object of the present disclosure is to provide a device storing multimedia data which is universally playable on a plurality of host devices which have different audio and/or image display capabilities and/or which use different compression standards.

In one embodiment, this object is met by a memory device that is removably insertable into a plurality of host devices. The memory device includes a memory storing multimedia data, a first circuit portion determining host device capabilities when the memory device is received in or connected to a host device, and a second circuit portion feeding or providing the stored multimedia data to the host device in a format compatible with the determined host device capabilities.

The multimedia data is stored in a first format and the second circuit portion transforms the multimedia data into the format compatible with the determined host device capabilities. The second circuit portion includes a transcoder for effecting the transformation of data. The transcoder includes a scaling block which scales the multimedia data to fit onto a display screen of the host device and a rate controller to adjust the data rate of the multimedia data fed to the host device. The second circuit portion may comprise a very-long-instruction-word processor.

In a further embodiment, the second circuit portion includes a plurality of transcoders, each capable of transforming the multimedia data to a different format.

The first circuit portion is configured to present a virtual file system to the host device, the virtual file system including at least two simulated directory structures with at least two virtual files, each of the at least two virtual files purporting to be the multimedia data in different formats. The first circuit portion is further configured to determine the one of the at least two virtual files that the host device attempts to access, and to determine the host device capabilities based on the determined one of the virtual files. The first circuit portion is preferably a reduced instruction set computing (RISC) processor.

The memory device is preferably a non-volatile memory such as a flash memory including one of a mini SD, SD, Compact Flash, Sony Stick, and a Memory Storage Card. Alternatively, the memory device may comprise any other known or hereafter developed memory device that is removably inserted into a host device.

The object of the present invention is also met by a memory device for providing multimedia data stored on a memory device to a host device in which the memory device is removably received. In this embodiment, multimedia data is stored in a first memory, a first program for determining host device capabilities when the memory device is received in the host device is stored in a second memory, and a second program for feeding the multimedia to the host device in a format compatible with the determined host device capabilities is stored on a third memory.

The multimedia data is stored in a first format and the second program includes the executable step of transforming the data into the format compatible with the determined host device capabilities. The step of transforming comprises scaling the multimedia data to fit onto a display screen of the host device and adjusting the data rate of the multimedia data fed to the host device.

The first program includes the executable step of presenting a virtual file system to the host device, the virtual file system including at least two simulated directory structures with at least two virtual files, each of the at least two virtual files purporting to be the multimedia data in different formats. The first program further comprises the executable step of determining the one of the at least two virtual files that the host device attempts to access, and determining the host device capabilities based on the determined one of the virtual files.

Alternatively, the executable step of determining comprises presenting a plurality of versions of the multimedia data in different directory structures and determining which of the plurality of versions is accessed by the host device.

As a further alternative, the executable step of determining comprises successively presenting the multimedia in different directory structures until the host device attempts to access the multimedia.

In accordance with an alternate embodiment, a transcoder device is connectable to an interface port of a host device having a display and a microprocessor, the host device being configured to derive and at least one of audibly reproduce audio and visually display images from a media file having a recognized compression format. The transcoder device includes a memory for receiving and storing a media file in a first compression format not recognized by the host device, and a processor adapted to receive a signal from the host device indicative of a second compression format that is recognizable by the host device and to transform data in the first compression format directly to the second compression format without first uncompressing the media file to thereby create a stream of at least one of audio and video which can be audibly reproduced and visually displayed by the host device.

By way of illustrative example, a transcoder device constructed in accordance with the alternate embodiment may be configured as a removable memory device that can be removably inserted into a host device to establish connectivity with the aforementioned interface port of the host device and thereby provide access to a stored media file. Alternative realizations of the transcoder device may be disposed within the housing of the host device in a configuration making it non-removable without disassembly of the housing. In accordance with such an alternative embodiment, it is contemplated that in exchange for a one-time fee or other subscription basis, a user might use a personal computer or other device with internet connectivity to download a desired media file in a particular format. Then, using appropriate software and/or physical interfaces (e.g., a USB connection, wireless interface or the like), download the media file to any and every transcoder device-equipped host device that he or she owns. As will be readily appreciated by those skilled in the art, the user need only download the media file once—without regard to the particular compression format in which that media is available (provided that is one of the many formats supported by the transcoder device).

Other objects and features of the present disclosure will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIGS. 3a and 3b are block diagrams of a memory and Boot Sector thereof in accordance with an FAT 16 file system;

FIGS. 4a and 4b are block diagrams of a memory and Boot Sector thereof in accordance with an FAT 32 file system;

FIG. 5 is a block diagram of a directory entry for a file in a FAT 16/32 file system;

DETAILED DESCRIPTION OF THE EMBODIMENTS

Figure 7:
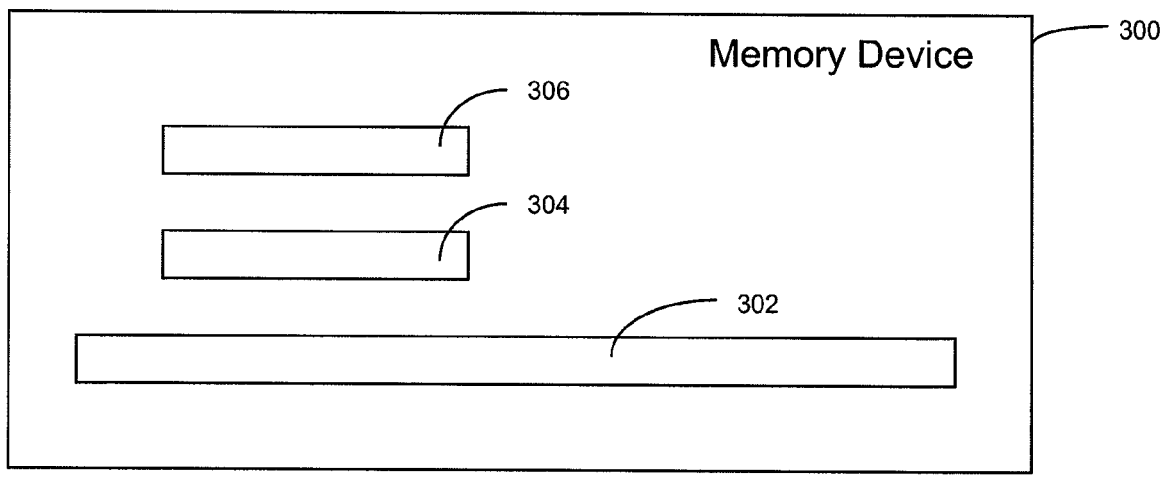
FIG. 7 is a schematic diagram showing the various parts of a memory device according to an embodiment of the present invention.

FIG. 7 is a schematic diagram of a memory device in accordance with an embodiment of the present invention. The memory device is preferably a multimedia card 300 including a flash memory 302 and a flash controller 304. In accordance with the present disclosure, a further circuit 306 is added so that the stored multimedia data is universally compatible with all devices to which the multimedia card may be connected, as will be described in more detail below. The further circuit 306 may be incorporated as part of a flash controller chip on which the flash controller 304 is arranged or may be implemented on a separate chip or substrate. Any non-volatile memory device that can be plugged into or otherwise removably connected to a host device, such as, for example, mini SD, SD, Smartmedia, Compact flash, Sony Memory Stick, xD, MMC, or USB flash memory devices may be used. Instead of the above-described non-volatile memory devices, any other known or hereafter developed data storage device may alternatively be used. In a specific embodiment, the multimedia card 300 is a micro-SD card and is insertable into various electro-mechanical adapters such as a mini-SD adapter, an SD adapter, a memory stick adapter, a USB adapter, or an xD picture card adapter or any other known or hereafter developed adapters or connectors. The adapters may be used to accommodate the memory device in slots designed for other memory cards and/or other memory devices. Furthermore, although the multimedia card 300 is shown having a separate controller 304—which is generally the case for flash memory devices—the multimedia card 300 may omit the controller 304. In that case, the multimedia card 300 may include only the memory 302 and the further circuit 306.

Figure 8:
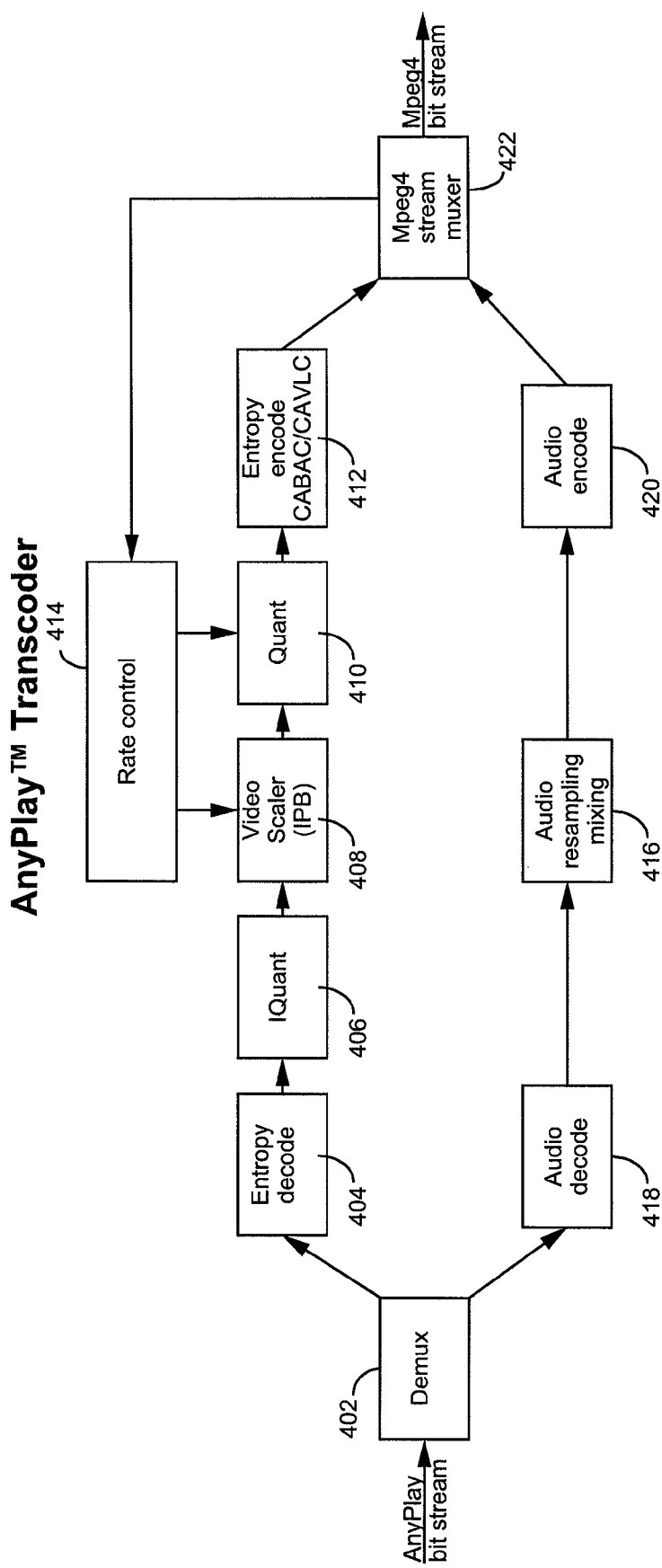
FIG. 8 is a block diagram of a transcoder according to an embodiment of the invention.

According to one embodiment of the present disclosure, the further circuit 306 includes a transcoder 400 as shown in FIG. 8, for example. The transcoder receives an input stream of the stored multimedia data and produces an MPEG-4 stream as an output. Although the example shown in FIG. 4 transforms the multimedia data to an MPEG-4 stream, the transcoder may transform the multimedia data to any known format or standard. The transcoder 400 is similar to a decoder connected directly to an encoder. However, in this case the decoder portion does not transform the input stream into an uncompressed video; such a solution would make large demands for processing time, battery power and memory. To increase efficiency, the input data is transformed in the compressed domain. As shown in FIG. 8, an input bit stream is first fed to a demultiplexer 402 which separates the audio stream and the video stream. The video stream is fed to an entropy decode block 404 and an inverse quantizer 406 which produces DCT data.

Figure 1:
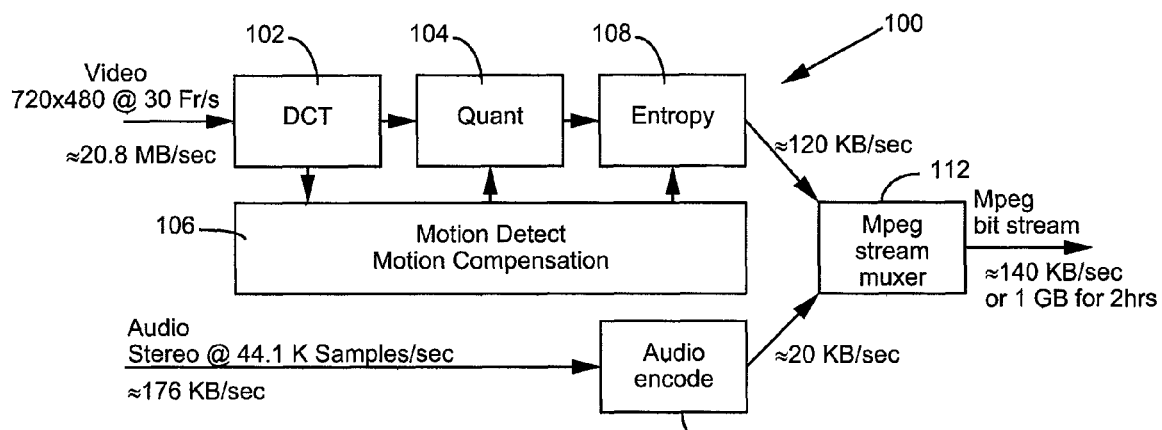
FIG. 1 is a block diagram of an MPEG-4 encoder.
Figure 2:
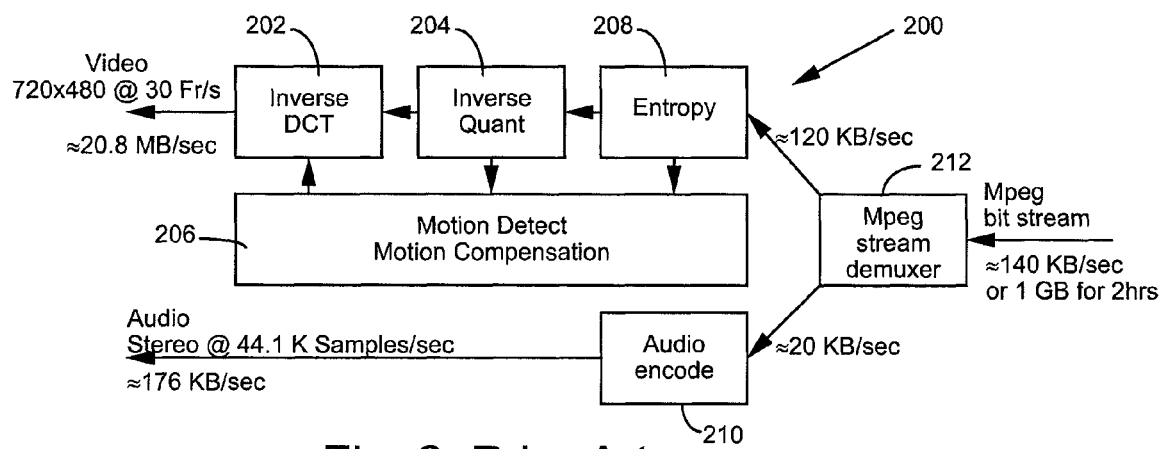
FIG. 2 is a block diagram of an MPEG-4 decoder.
Figure 6:
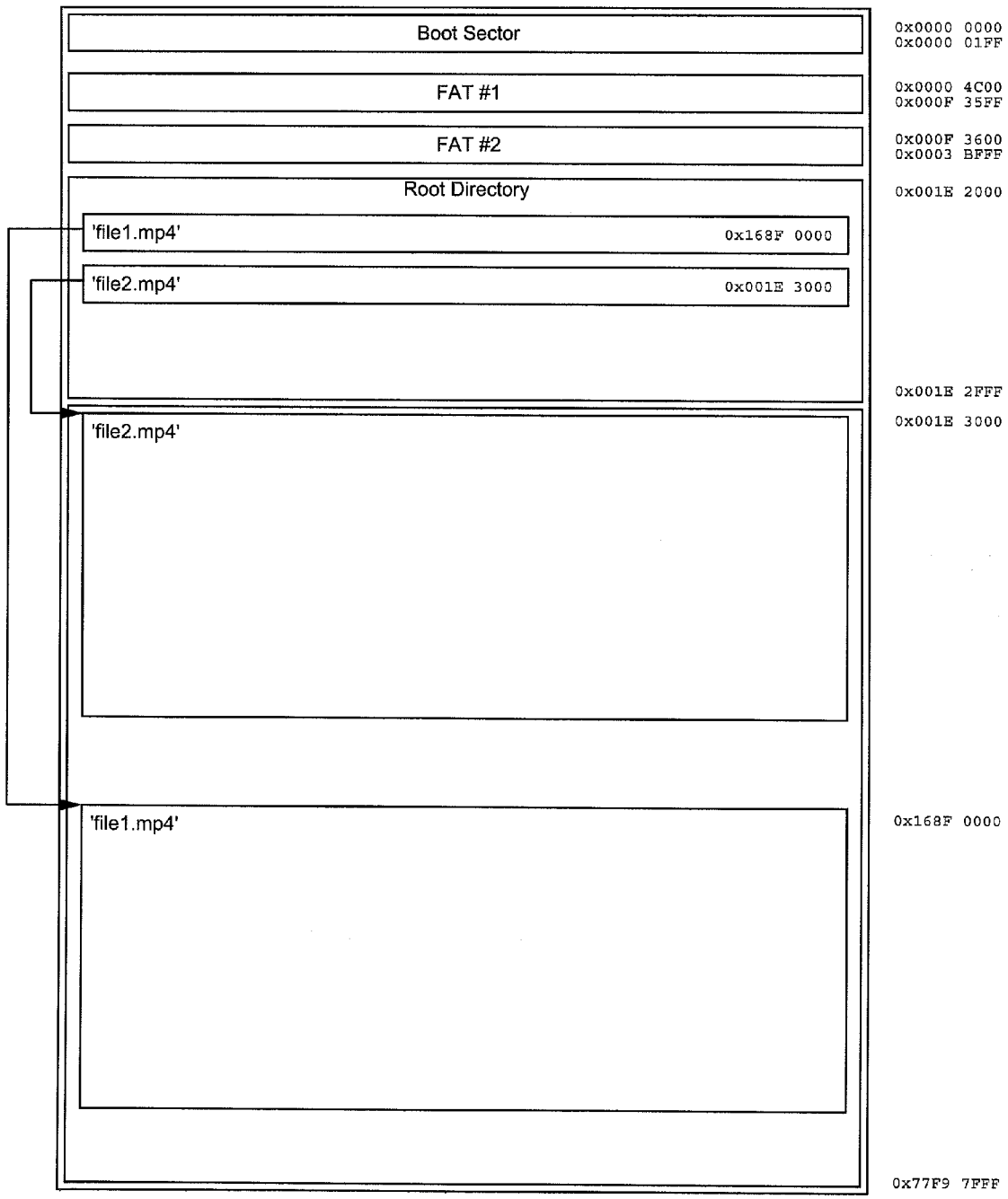
FIG. 6 is a schematic block diagram of a memory showing two stored files using an FAT 16/32 file system.

A video scaler 408 receives the DCT data and magnifies or shrinks the DCT data to fit a target device screen size. The target device is the host device to which the multimedia card is currently removably connected and on which the multimedia is to be played. The video scaler 408 optionally uses modeling of human vision sensitivity to determine the DCT data to extract when shrinking the DCT data such that the extracted data will not be missed in the reproduced image. The scaled data is received by a quantizer 410 and entropy encoder 412, which are similar to the quantizer 104 and entropy block 108 described in the Background section above and shown in FIG. 1. The entropy encoder 412 preferably uses Context-adaptive binary arithmetic coding (CABAC). If CABAC is not supported by the host device, then Context Adaptive Variable Length Coding (CAVLC) may be employed. Although CABAC and CAVLC are specifically described, any entropy encoding technique know or hereafter developed may also be used in entropy encoder 412, depending on the desired output format and/or the capabilities of the host device.

A rate control block 414 ensures that the correct amount of data is generated for the target device by checking the MPEG-4 stream output and sending rate control signals to the video scaler 408 and quantizer 410. The rate controller allows the data to be output to meet various different profiles of MPEG-4, for example.

The audio stream from the demultiplexer 402 is fed to an audio decoder 418 where the audio data is partially decompressed. An audio resampler 416 converts the partially decompressed audio stream to a form compatible with the target device capabilities. For example, if the host device includes two speakers, the audio resampler 416 merges the available audio information into two stereo channels. The audio resampler 416 is analogous to the video scaler 408. The resampled audio data is then encoded using an audio encoder 420. An MPEG-4 multiplexer 422 combines the video stream and the audio stream to produce an MPEG-4 bit stream which is fed to the target or host device. The MPEG-4 multiplexer 422 is similar to the multiplexer 112 described in the Background section above and shown in FIG. 1.

FIG. 8 depicts a transcoder for transforming the stored multimedia data to MPEG-4 format. Instead of MPEG-4, the transcoder could alternatively be designed to transform the stored multimedia data to another format such as, for example, MPEG-2.

The stored multimedia data, i.e., the input to the transcoder, is preferably annotated encoded data that is easy to transcode from the stored format to a format compatible with the host device. In one embodiment, the uncompressed data may be compressed using a known compression algorithm and then annotated by adding hints and pointers for the transcoder to make it easier to transcode the multimedia data in real time.

Figure 9:
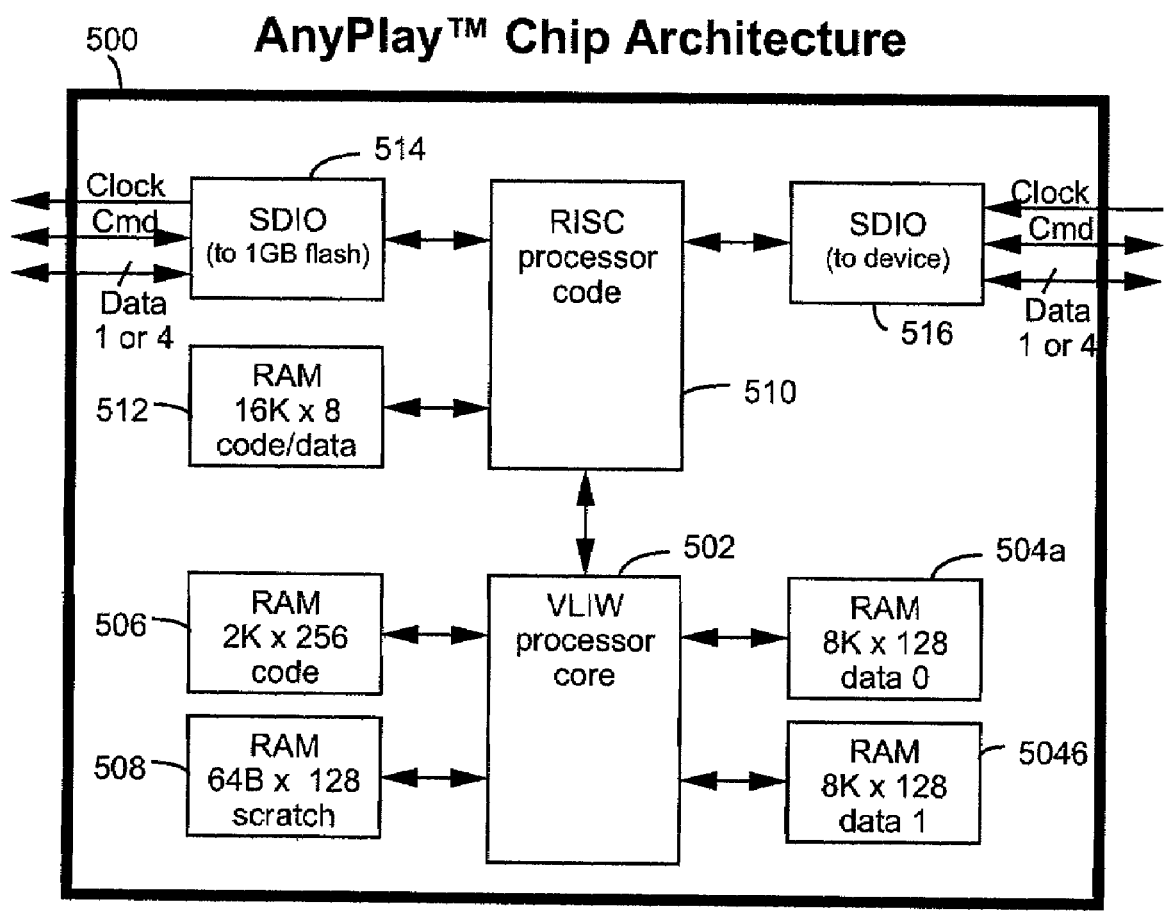
FIG. 9 is a block diagram depicting a chip architecture of a chip for the memory device of FIG. 7.

As stated above, the further circuit 306 may be implemented on a separate chip. FIG. 9 shows an embodiment of a chip 500 on which the further circuit 306 including the transcoder 400 may be implemented. The chip 500 preferably includes a very-long-instruction-word (VLIW) processor suitable for executing video and audio signal processing algorithms. The VLIW processor 502 is directly connected to a code memory 506 which stores a program for running the transcoder, a scratch memory 508, and data memories 504a, 504b. The chip 500 also includes a reduced instruction set computing (RISC) processor core 510. The RISC processor 510 is connected to a memory 512 which includes a program of instructions. Although a VLIW processor 502 and a RISC processor 510 are disclosed, each of these processor may alternatively comprise any processor known or hereafter developed. Furthermore, one processor may perform the functions of both the VLIW processor 502 and the RISC processor 510. Furthermore, instead of using a processor or processors, the functions of VLIW processor 502 and the RISC processor 510 may be performed by a custom circuit designed specifically for the device of the present application.

Ports 514, 516 are connected to the RISC processor and allow the RISC processor 510 to communicate with the media card memory 302 and the target or host device. In the specific embodiment shown in FIG. 9, the ports 514, 516 are Secure Digital Input Output (SDIO) ports which are designed to communicate with SD cards and an SD card interface. If the multimedia card 300 is not an SD card, the ports 514, 516 may comprise a different port, as required for the memory type and the interface type of the host device.

Figure 13:
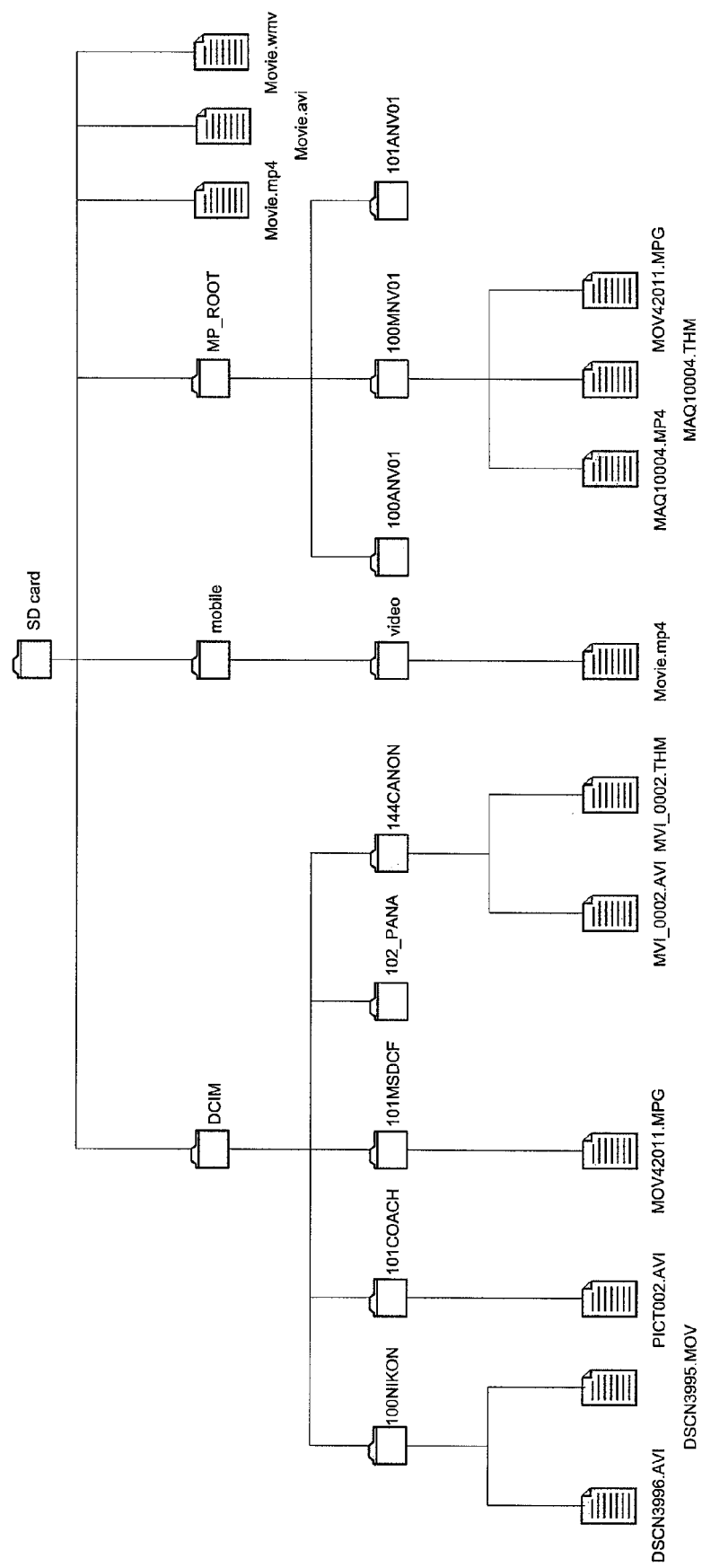
FIG. 13 is a schematic diagram of a directory structure according to an embodiment of the multimedia card according to the present invention.

To determine the host device parameters and/or the format of the multimedia data required by the host device, the RISC processor 510 communicates with the host device preferably through port 516. Upon insertion of the multimedia card into a host device, or turning on the host device with the multimedia card inserted therein, the host device typically looks for playable files in a predetermined or known file directory structure. The host device searches for playable files which may, for example, be flagged or identified by suffixes in the file names. In one embodiment, the multimedia card 300 includes one multimedia file saved in a stored format. As described above, the VLIW processor 502 is capable of transforming the stored file into a different format using the transcoder 400. Upon connection or insertion of the multimedia card into the host device, the RISC processor 510 presents a virtual file system to the host device so that it appears to the host device that there is one file for each of a plurality of formats. The virtual file system allows the stored file to appear as a plurality of files in different directory structures. The host device searches the virtual file system for files that can be played back in a specific directory structure known to that particular host device. An example of such a directory structure is shown in FIG. 13. For example, FIG. 13 shows a DCIM folder with various subfolders which are recognized by digital cameras, a mobile folder and video subfolder in the middle of FIG. 13 which is recognized by Nokia devices, and a MP_ROOT folder which is recognized by SONY personal playstation devices. Files such as Movie.mp4, Movie.avi, and Movie.wmv on the right side of FIG. 13 may also be saved directly in the root directory for devices such as PCs which will access the files directly. This virtual file system thereby allows many different devices to access the stored multimedia without the need to modify operation of the host devices. When the host device locates a file in the virtual file system that it recognizes, the host device will generate a read request to access the memory space indicated by that virtual file. From the address in that request, the RISC processor 510 determines the type of host device and therefore knows into what format the transcoder should transform the stored file and also what settings the transcoder should use such as, for example, spatial characteristics (x- and y-size of the display), frames per second, color capabilities, and bit rate. To implement many different formats for various host devices, the code memory 506 may include plural transcoders which are selected based on the type of host device determined by the RISC processor 510. The actual multimedia file is then read by the RISC processor 510 and transcoded.

As stated above, there is typically one multimedia file, i.e., a movie, stored on the multimedia card 300. The virtual file system presented to the host device by the RISC processor 510 includes a virtual root directory with a plurality of different virtual subdirectories and files recognizable by different host devices. Whether a virtual file exists or not, its location occupies space in the file system's address space. In FAT 16, the address space is limited to 2 GB. In FAT 32, the address space is limited to 2 TB. However, flash media conforming to the SD 2.0 specification is limited to 32 GB. Thus, even virtual address space is limited.

Figure 10:
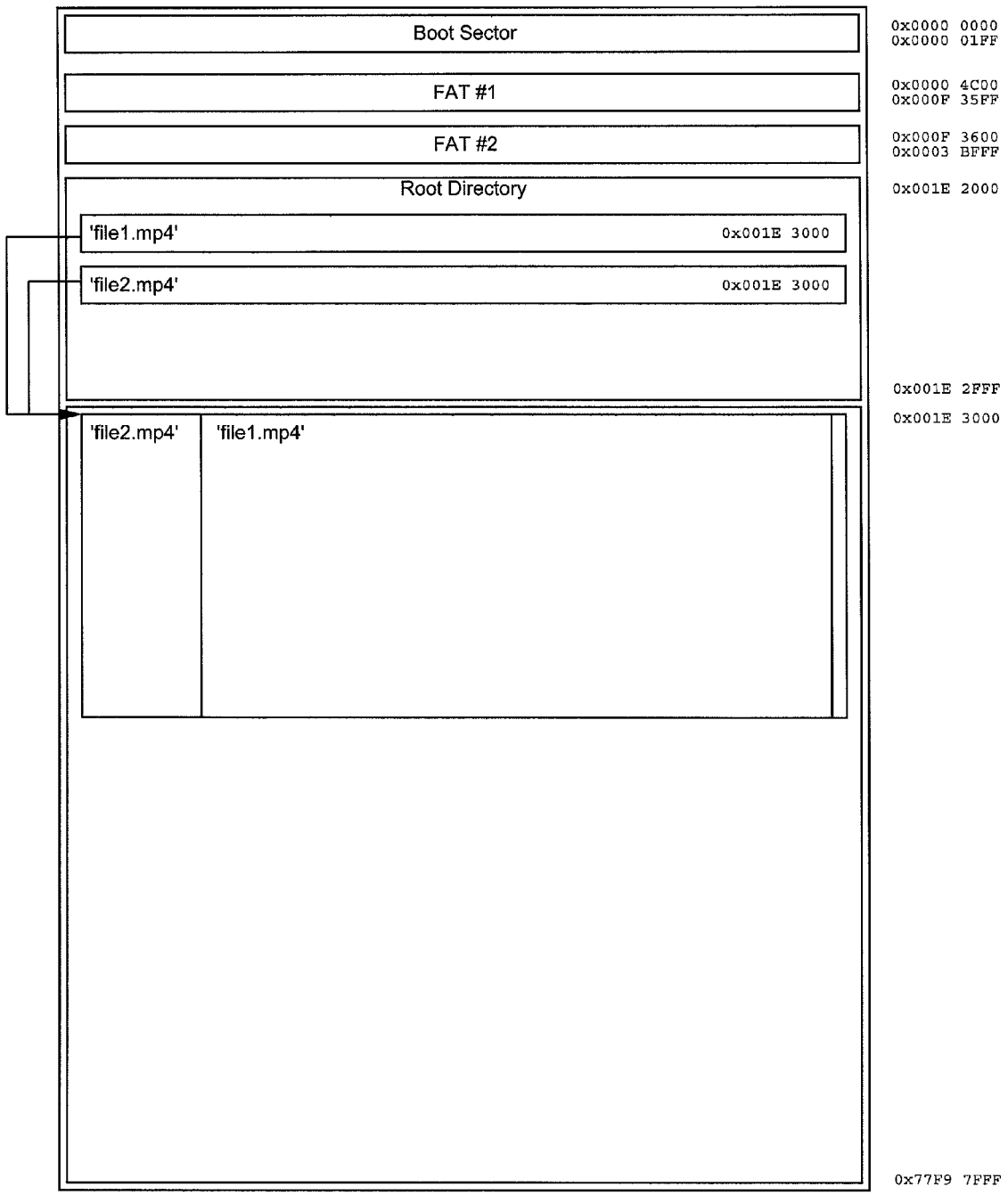
FIG. 10 is a schematic block diagram of a memory with two stored files according to an embodiment of the present disclosure.

A feature length film requires about 2 GB of space. However, that film may appear 100 times or more in the virtual file system, requiring 200 GB of address space. Thus, another embodiment of the present disclosure involves implementing the virtual file system so that many files may appear in the root directory without surpassing the limit on the virtual address space for the file system being used. FIG. 10 illustrates one such embodiment, which uses the fact that many virtual files will have the same data. For example, the same file data may need to appear 10 times in 10 different places in the file system. For an actual memory device, the file would actually exist in 10 different places. However, the virtual file system has 10 file entries that point to the same sector locations. In the specific embodiment of FIG. 10, both file1 and file2 point to memory address 0x001E 3000. Accordingly, there is only one file in the virtual address space.

Figure 11:
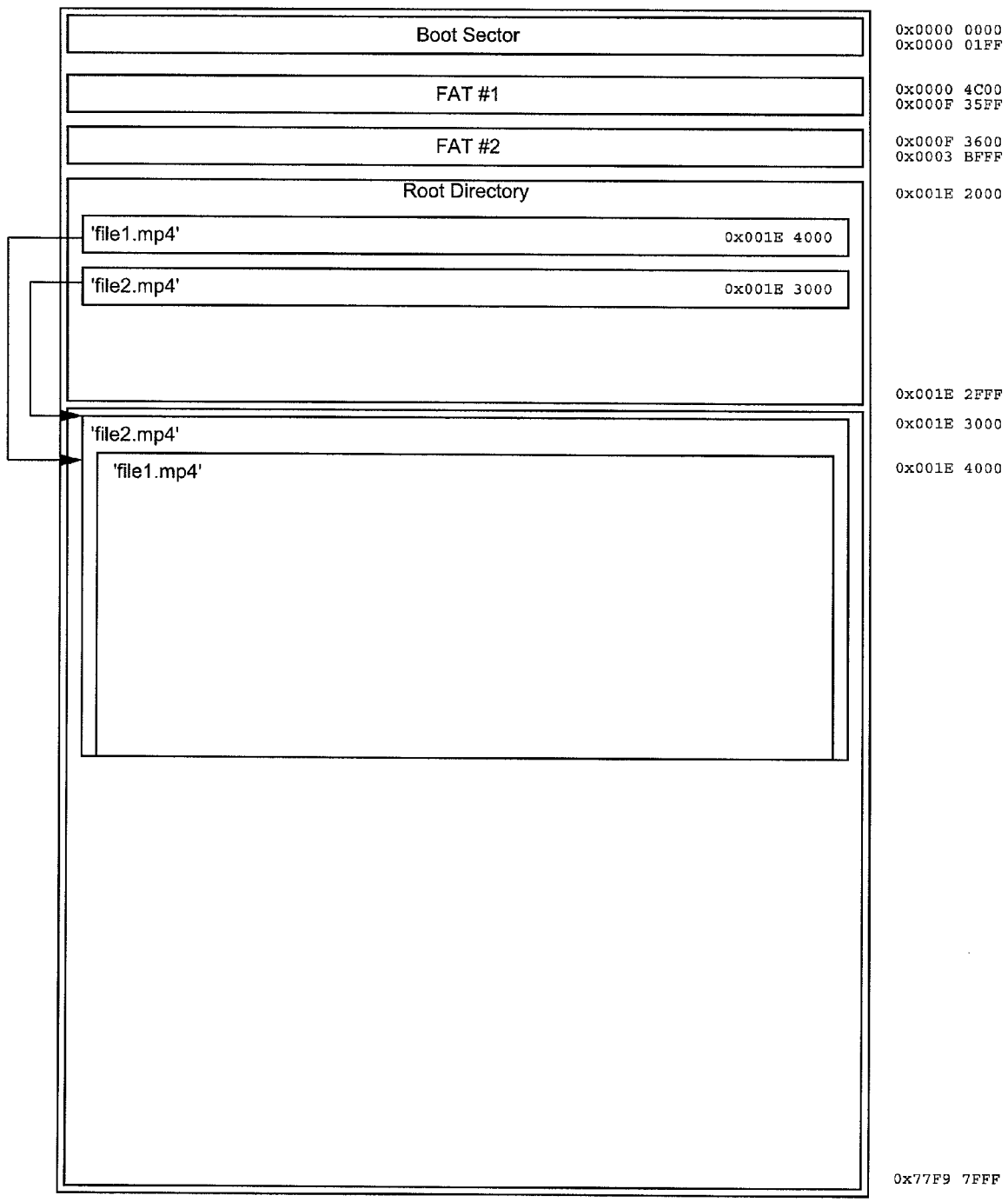
FIG. 11 is a schematic block diagram of a memory with two stored files according to an embodiment of the present disclosure.

In a further embodiment of the virtual file system shown in FIG. 11, each virtual file is overlapping. In this case, two or more files occupy almost all of the same space. The difference is that the two files have different starting locations (i.e., sectors or blocks). In this embodiment, a film for use by a Sony PSP is virtual file1 and the same film for use by an N73 cell phone is virtual file 2, each requiring 2 GB. The data is very different for the two files. If stored on physical media, they would each require separate areas for storage. In the embodiment of FIG. 11, the two files require 2 GB+1 block of space. Thus, each additional unique file requires 1 extra block of space. Using 32 KB blocks as an example, file1 starts at address 0x001 E 3000 and file 2 starts at 0x001 E 4000, each ending at the same address block. Thus, the techniques of FIGS. 10 and 11 allow a large number of virtual files to be presented in a limited virtual address space. Furthermore, the techniques in the embodiments of FIGS. 10 and 11 may be combined.

If the host device does not recognize any of the directories or folders in the virtual file system, a directory structure for settings may be implemented in which the setting to be used for the transcoding are selected by the host device itself or a user through the host device. Table 1 is a sample listing of settings for a video parameters of a host device. A user may select one of many known display sizes, i.e., 1280×1024. Alternatively, the user may select the x pixel value and y pixel value, or the default value used by the movie to be played back. The user may select the format of the movie it requires. All of the above selections are made by navigating through the various settings sub-directories and selecting the appropriate sub-directories. Once the selections are made, the multimedia card of the present disclosure has the information it needs to make the proper transcoding of the stored movie or other multimedia content. Table 1 shows only the spatial and format video parameters which may be selected. There are many different video parameters and audio parameters (mono, stereo, surround sound, etc.) which may be selected. If a host device is designed to play movies or other multimedia content using the multimedia card of the present disclosure, the host device may be programmed to automatically select from the settings directory structure the appropriate parameters required for playback. The directory structure for setting in Table 1 may be combined with the virtual file system described above so that a host device first looks for a directory it recognizes. If none are found, the device then selects settings from the directory structure for settings.

TABLE 1

| | |
|---|---|
| SDCard/Settings/ | |
| SDCard/Settings/video/ | |
| SDCard/Settings/video/sqcif/ | 128×96 |
| SDCard/Settings/video/qcif/ | 176×144 |
| SDCard/Settings/video/cif/ | 352×288 |
| SDCard/Settings/video/4cif/ | 704×576 |
| SDCard/Settings/video/qqvga/ | 160×120 |
| SDCard/Settings/video/qvga/ | 320×240 |
| SDCard/Settings/video/vga/ | 640×480 |
| SDCard/Settings/video/svga/ | 800×600 |
| SDCard/Settings/video/xga/ | 1024×768 |
| SDCard/Settings/video/uxga/ | 1600×1200 |
| SDCard/Settings/video/qxga/ | 2048×1536 |
| SDCard/Settings/video/sxga/ | 1280×1024 |
| SDCard/Settings/video/qsxga/ | 2560×2048 |
| SDCard/Settings/video/hsxga/ | 5120×4096 |
| SDCard/Settings/video/wvga/ | 852×480 |
| SDCard/Settings/video/wxga/ | 1366×768 |
| SDCard/Settings/video/wsxga/ | 1600×1024 |
| SDCard/Settings/video/wuxga/ | 1920×1200 |
| SDCard/Settings/video/woxga/ | 2560×1600 |
| SDCard/Settings/video/wqsxga/ | 3200×2048 |
| SDCard/Settings/video/wquxga/ | 3840×2400 |
| SDCard/Settings/video/whsxga/ | 6400×4096 |
| SDCard/Settings/video/whuxga/ | 7680×4800 |
| SDCard/Settings/video/cga/ | 320×200 |
| SDCard/Settings/video/ega/ | 640×350 |
| SDCard/Settings/video/hd480/ | 852×480 |
| SDCard/Settings/video/hd720/ | 1280×720 |
| SDCard/Settings/video/hd1080/ | 1920×1080 |
| SDCard/Settings/video/psp/ | 368×208 |
| SDCard/Settings/video/x__32/ | x__pixels=32 |
| SDCard/Settings/video/x__48/ | x__pixels=48 |
| SDCard/Settings/video/x__64/ | x__pixels=64 |
| SDCard/Settings/video/x__80/ | x__pixels=80 |

TABLE 1-continued

| | |
|---|---|
| ... | |
| SDCard/Settings/video/x_7680/ | x_pixels=7680 |
| SDCard/Settings/video/default/ | Movie's X resolution |
| SDCard/Settings/video/THEMOVIE.MP4 | Movie with current settings in MP4 format |
| SDCard/Settings/video/THEMOVIE.AVC | Movie with current settings in AVC format |
| SDCard/Settings/video/THEMOVIE.MOV | Movie with current settings in QuickTime format |
| SDCard/Settings/video/THEMOVIE.AVI | Movie with current settings in AVI format |
| SDCard/Settings/video/THEMOVIE.WMV | Movie with current settings in WMV format |
| SDCard/Settings/video/x_320/y_32/ | x_pixels=320 : y_pixels=32 |
| SDCard/Settings/video/x_320/y_48/ | x_pixels=320 : y_pixels=48 |
| SDCard/Settings/video/x_320/y_64/ | x_pixels=320 : y_pixels=64 |
| ... | |
| SDCard/Settings/video/x_320/y_4800/ | x_pixels=320 : y_pixels=4800 |
| SDCard/Settings/video/x_320/default/ | Movie's Y resolution |
| SDCard/Settings/video/x_320/THEMOVIE.MP4 | x_pixels=320 : Movie with current settings in MP4 format |
| SDCard/Settings/video/x_320/THEMOVIE.AVC | x_pixels=320 : Movie with current settings in AVC format |
| SDCard/Settings/video/x_320/THEMOVIE.MOV | x_pixels=320 : Movie with current settings in QuickTime format |
| SDCard/Settings/video/x_320/THEMOVIE.AVI | x_pixels=320 : Movie with current settings in AVI format |
| SDCard/Settings/video/x_320/y_256/fr_5/ | x_pixels=320 : y_pixels=256 : frame_rate=5 per second |
| SDCard/Settings/video/x_320/y_256/fr_6/ | x_pixels=320 : y_pixels=256 : frame_rate=5 per second |
| SDCard/Settings/video/x_320/y_256/fr_7/ | x_pixels=320 : y_pixels=256 : frame_rate=5 per second |
| ... | |
| SDCard/Settings/video/x_320/y_256/fr_1000/ | x_pixels=320 : y_pixels=256 : frame_rate=1000 per second |
| SDCard/Settings/video/x_320/y_256/default/ | Movie's frame rate |
| SDCard/Settings/video/x_320/y_256/THEMOVIE.MP4 | x_pixels=320 : y_pixels=256 : Movie with current settings in MP4 format |
| SDCard/Settings/video/x_320/y_256/THEMOVIE.AVC | x_pixels=320 : y_pixels=256 : Movie with current settings in AVC format |
| SDCard/Settings/video/x_320/y_256/THEMOVIE.MOV | x_pixels=320 : y_pixels=256 : Movie with current settings in QuickTime format |
| SDCard/Settings/video/x_320/y_256/THEMOVIE.AVI | x_pixels=320 : y_pixels=256 : Movie with current settings in AVI format |
| SDCard/Settings/video/x_320/y_256/default/ | Movie's frame rate |
| SDCard/Settings/video/x_320/y_256/default/audio/ | Various audio settings |
| SDCard/Settings/video/x_320/y_256/default/THEMOVIE.MP4 | x_pixels=320 : y_pixels=256 : frame_rate=movie's : Movie with current settings in MP4 format |
| SDCard/Settings/video/x_320/y_256/default/THEMOVIE.AVC | x_pixels=320 : y_pixels=256 : frame_rate=movie's : Movie with current settings in AVC format |
| SDCard/Settings/video/x_320/y_256/default/THEMOVIE.MOV | x_pixels=320 : y_pixels=256 : frame_rate=movie's : Movie with current settings in QuickTime format |
| SDCard/Settings/video/x_320/y_256/default/THEMOVIE.AVI | x_pixels=320 : y_pixels=256 : frame_rate=movie's : Movie with current settings in AVI format |
| SDCard/Settings/video/x_320/y_256/default/audio/chan_1/ | audio channels=1 |
| SDCard/Settings/video/x_320/y_256/default/audio/chan_2/ | audio channels=2 |
| SDCard/Settings/video/x_320/y_256/default/audio/chan_3/ | audio channels=3 |
| ... | |
| SDCard/Settings/video/x_320/y_256/default/audio/chan_32/ | audio channels=32 |
| SDCard/Settings/video/x_320/y_256/default/audio/THEMOVIE.MP4 | x_pixels=320 : y_pixels=256 : frame_rate=movie's : Movie with current settings in MP4 format |
| SDCard/Settings/video/x_320/y_256/default/audio/THEMOVIE.AVC | x_pixels=320 : y_pixels=256 : frame_rate=movie's : Movie with current settings in AVC format |
| SDCard/Settings/video/x_320/y_256/default/audio/THEMOVIE.MOV | x_pixels=320 : y_pixels=256 : frame_rate=movie's : Movie with current settings in QuickTime format |
| SDCard/Settings/video/x_320/y_256/default/audio/THEMOVIE.AVI | |

TABLE 1-continued x__pixels=320 : y__pixels=256 : frame__rate=movie's : Movie with current settings in AVI format Instead of using a virtual file system, the multimedia data is alternatively stored in a plurality of different formats in different directory structures. The directory structures may, for example, be similar to the structures shown in FIG. 13. This solution requires more memory than the previous embodiment and thus may be used for cartoons, short video clips, and other relatively short multimedia presentations. However, this embodiment does not require a transcoder. Accordingly, the further circuit 306 may be simplified or even omitted.

Figure 12:
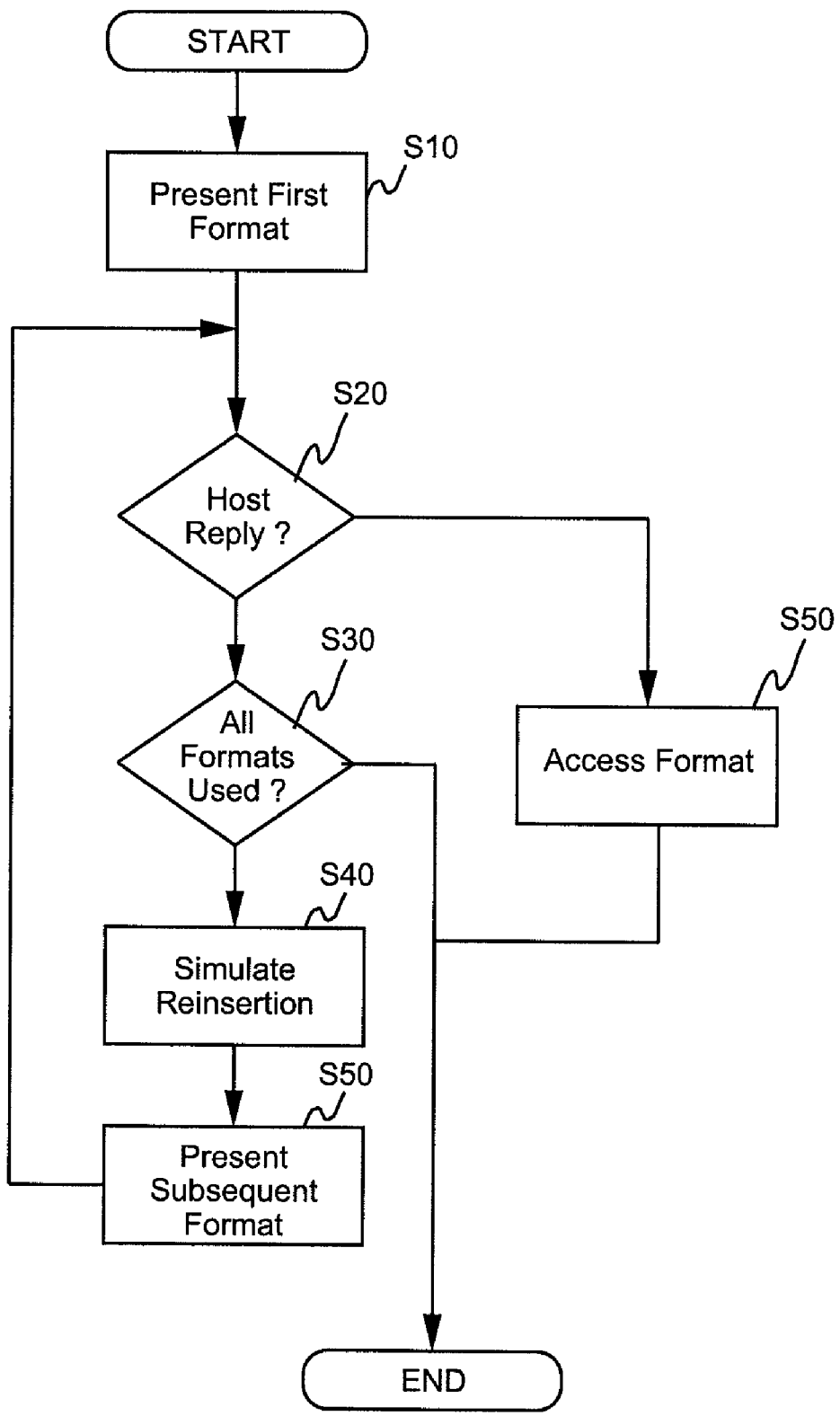
FIG. 12 is a flow diagram illustrating an embodiment of a method according to the present invention.

In a still further embodiment illustrated in FIG. 12, the RISC processor 510 of the further circuit 306 presents a first file format to the host device in a first directory structure, step S10. If the host device does not recognize the first file format, the host device will do nothing. The RISC processor detects whether the host replies to the first file format, step S20. The RISC processor determines if all formats have been presented, step S30. If not, the RISC processor then shuts down and restarts to simulate reinsertion or reconnection of the multimedia card in the host device, step S40. Upon restart, the RISC processor then presents a subsequent file format in a second directory structure, step S50. The step S20-S50 can be repeated until the host device accesses one of the presented file formats, step S60, or until all formats have been presented. Accordingly, this embodiment successively presents the multimedia in different directory structures until the host device attempts to access the media. The RISC processor 510 thus determines the capabilities of the host device from the file format that is eventually accepted and accessed by the host device.

In yet another embodiment of the invention, the memory device includes only a memory 302. In this embodiment, the memory device 300 does not have processing capabilities. Instead the memory 302 may include the programs necessary to implement the above functions. The processing capabilities of the host device itself are utilized to transform the data from its initial form to a format that is compatible with the host device. As a further alternative, the programs required for transcoding or hardware for performing the transcoding may be stored or implemented at the host device itself. In this case, the host device first transcodes the multimedia content from a first compression format to a second compression format, and then decodes the second compression format to produce a complete video.

For all of the above embodiments, playing back the multimedia data on the multimedia card 300 is preferably immediately started by the host device upon access of the stored multimedia data by the host device. In some cases, this is accomplished by an autoplay feature of the host device itself. In other cases, the RISC processor 510 includes flags or files that instruct the host device to start the multimedia. In some cases, such as where the multimedia includes only one video clip or a movie, the multimedia data begins playing directly. In other cases, a startup or menu page may be displayed. The latter is applicable if there are a plurality of multimedia presentations stored on the memory device, such as a plurality of episodes or a plurality of cartoons. In that case, the user can select from the main screen the particular presentation desired using the input mechanism of the host device.

Thus, while there have shown and described and pointed out fundamental novel features of the invention as applied to preferred embodiments thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A memory device removably connectable to a plurality of host devices, comprising:
   a first memory storing multimedia data;
   a first circuit portion operable for determining host device capabilities when the memory device is connected to a host device; and
   a second circuit portion providing the multimedia data from the memory device to the connected host device in a format compatible with the host device capabilities determined by the first circuit,
   wherein the memory device is removably couplable as a unit to an interface port of the host device, and the memory device is coupled to the interference port of the host device when the memory device is connected to the host device.

2. The memory device of claim 1, wherein the multimedia data is stored in a first format and said second circuit portion transforms the multimedia data into the format compatible with the determined host device capabilities.

3. The memory device of claim 2, wherein said second circuit portion includes a transcoder.

4. The memory device of claim 2, wherein said second circuit portion includes a plurality of transcoders, each capable of transforming the multimedia data to a different format.

5. The memory device of claim 3, wherein the transcoder includes a scaling block which scales the multimedia data to fit onto a display screen of the host device.

6. The memory device of claim 3, wherein the transcoder includes a rate controller to adjust the data rate of the multimedia data provided to the host device.

7. The memory device of claim 1, wherein the second circuit portion comprises a very-long-instruction-word processor.

8. The memory device of claim 1, wherein said first circuit portion is configured to present a virtual file system to the host device, the virtual file system including at least two simulated directory structures each having a virtual file, each of the virtual files purporting to be the multimedia data in a different format.

9. The memory device of claim 8, wherein the first circuit portion is configured to determine the virtual file that the host device attempts to access, and determine the host device capabilities based on the determined virtual file.

10. The memory device of claim 8, wherein the second circuit portion is a reduced instruction set computing processor.

11. The memory device of claim 8, wherein the memory device is a flash memory card.

12. A memory device removably connectable to a plurality of host devices, comprising:
a first memory storing multimedia data;
a second memory storing a first program including processor executable steps for determining host device capabilities when the memory device is connected to the host device; and
a third memory storing a second program including processor executable steps for providing the multimedia data to the host device in a format compatible with the host device capabilities by the steps of the first program,
wherein the memory device is removably couplable as a unit to an interface port of the host device, and the memory device is coupled to the interference port of the host device when the memory device is connected to the host device.

13. The memory device of claim 12, wherein the multimedia data is stored in a first format and said second program further comprises processor executable steps for transforming the multimedia data from the first format into the format compatible with the host device capabilities.

14. The memory device of claim 13, further comprising a transforming processor for executing said second program.

15. The memory device of claim 13, wherein said second program processor executable steps include scaling the multimedia data to fit onto a display screen of the host device.

16. The memory device of claim 13, wherein said second program processor executable steps include adjusting the data rate of the multimedia data fed to the host device.

17. The memory device of claim 12, wherein said first program processor executable steps include presenting a virtual file system to the host device, the virtual file system including at least two simulated directory structures each with a virtual file, each of the virtual files purporting to be the multimedia data in a different format.

18. The memory device of claim 17, wherein said first program processor executable steps include determining which of the virtual files the host device attempts to access, and determining the host device capabilities based on the determined virtual file.

19. The memory device of claim 12, wherein said first program processor executable steps include presenting a plurality of versions of the multimedia data in different directory structures, and determining which of the plurality of versions is accessed by the host device.

20. The memory device of claim 12, wherein said first program processor executable steps include successively presenting the multimedia data in different directory structures until the host device attempts to access the multimedia data.

21. A method of operating a host device having a display and a microprocessor and being configured to derive and at least one of audibly reproduce audio and visually display images from a media file having a recognized compression format, comprising the steps of:
providing a media file in a first compression format not recognized by the host device by coupling a programmable module unit having a memory to an interface port of the host device;
receiving, at the programmable module unit coupled to the interface port of the host device, an indication of a second compression format that is recognizable by the host device;
transforming data in the first compression format directly to the second compression format without first uncompressing the media file to thereby create a stream of at least one of audio and video which can be audibly reproduced and visually displayed by the host device.

22. The method of claim 21, wherein the programmable module unit is removable and includes an onboard microprocessor and wherein the step of providing is performed by inserting the programmable module into the host device.

23. The method of claim 22, wherein the memory of the programmable module unit contains code executable by the onboard microprocessor for processing the indication of a second compression format received during the step of receiving and for initiating the step of transforming.

24. The method of claim 23, further including a step of receiving, at the programmable module unit, an indication of a display screen size of the host device and wherein the memory of the programmable module unit further contains code executable by the onboard microprocessor for scaling a video output produced during the transforming step to fit a display screen of the host device.

25. The method of claim 21, wherein the memory of the programmable module unit contains executable code for processing the indication of a second compression format received during the step of receiving and for initiating the step of transforming.

26. The method of claim 25, further including a step of receiving an indication of a display screen size of the device and wherein the memory of the programmable module unit further contains executable code for scaling a video output produced during the transforming step to fit a display screen of the host device.

27. The method of claim 22, wherein the step of providing is performed by inserting the programmable module unit into one of a digital camera, a wireless terminal, a personal digital assistant, and a portable game console.

28. The method of claim 21, wherein the programmable module unit comprises at least one of a very long instruction word (VLIW) processor adapted to execute stored video and audio signal processing algorithms and a RISC processor core.

29. The method of claim 22, wherein the host device is a first host device, the method further including the steps of:
removing the programmable module unit from the first host device;
inserting the programmable module unit into a second host device, the second host device having a display and a microprocessor and being configured to derive and at least one of audibly reproduce audio and visually display images from a media file having a recognized compression format;
receiving, at the programmable module unit, an indication of a third compression format that is recognizable by the second host device; and
transforming data in the first compression format directly to the third compression format without first uncompressing the media file to thereby create a stream of at least one of audio and video which can be audibly reproduced and displayed by the second host device.

30. The method of claim 29, wherein the first compression format is a known compression format including annotations for facilitating transcoding in real time and the second compression format is one of MPEG-2 and MPEG-4.

31. A transcoding device connectable to an interface port of a host device having a display and a microprocessor, the host device being configured to derive and at least one of audibly reproduce audio and visually display images from a media file having a recognized compression format, the transcoding device comprising:
- a memory for receiving and storing a media file in a first compression format not recognized by the host device; and
- a processor adapted to receive a signal from the host device indicative of a second compression format that is recognizable by the host device and to transform data in the first compression format directly to the second compression format without first uncompressing the media file to thereby create a stream of at least one of audio and video which can be audibly reproduced and displayed by the host device,
- wherein the transcoding device is removably couplable as a module unit to the interface port of the host device, and the transcoding device is coupled to the interference port of the host device when the memory device is connected to the host device.

32. The transcoding device of claim 31, wherein the memory contains a media file in the first compression format.

33. The transcoding device of claim 32, wherein the memory further contains code executable by the processor for processing the indication of the second compression format supplied by the host device.

34. The transcoding of claim 33, wherein the memory further contains code executable by the processor for scaling a video output, produced during transformation of the first compression format directly to the second compression, to fit a display screen of the host device.

35. The transcoding device of claim 31, wherein the processor comprises at least one of a very long instruction word (VLIW) processor adapted to execute stored video and audio signal processing algorithms and a RISC core.

36. A method of operating a device configured to derive and at least one of audibly reproduce audio and visually display images from a media file having a recognized compression format, the method comprising:
- transferring a first media file to a memory disposed within the device, the first media file being in a first compression format not recognized by the device;
- transforming data in the first compression format directly to the recognized compression format without first uncompressing the first media file to thereby create a stream of at least one of audio and video;
- at least one of audibly reproducing the stream of audio and visually displaying the stream of video created during the transforming step.

37. The method of claim 36, further including a step of overwriting the first media file with a second media file, the second media file being in the first compression format.

38. The method of claim 37, wherein the step of overwriting comprises obtaining the second media file via an internet connection.

39. The method of claim 37, wherein the step of overwriting comprises transferring the second media file without first removing the memory from the device.

40. The method of claim 39, wherein the step of overwriting comprises transferring the second media file via a wireless transmission channel.

41. A method of operating a device having a display and a microprocessor and being configured to derive and at least one of audibly reproduce audio and visually display images from a media file having a recognized compression format, comprising the steps of:
- providing a media file in a first compression format not recognized by the device by coupling a memory module to an interface port of the device;
- within the memory module, transforming data in the first compression format directly to the second compression format without first uncompressing the media file to thereby create a stream of at least one of audio and video which can be audibly reproduced and visually displayed by the device.

* * * * *